United States Patent
Torre et al.

(10) Patent No.: US 6,831,137 B2
(45) Date of Patent: Dec. 14, 2004

(54) IMPACT RESISTANT TRANSPARENT POLYAMIDE ALLOYS

(75) Inventors: Hans Dalla Torre, Domat/Ems (CH); Manfred Hewel, Rodels (CH)

(73) Assignee: EMS Inventa AG, Zurich (CH)

( * ) Notice: Subject to any disclaimer, the term of this patent is extended or adjusted under 35 U.S.C. 154(b) by 364 days.

(21) Appl. No.: 10/066,927

(22) Filed: Feb. 4, 2002

(65) Prior Publication Data

US 2002/0128377 A1 Sep. 12, 2002

Related U.S. Application Data

(63) Continuation-in-part of application No. 09/520,252, filed on Mar. 7, 2000, now abandoned, which is a continuation-in-part of application No. 09/098,873, filed on Jun. 17, 1998, now abandoned.

(30) Foreign Application Priority Data

Jun. 17, 1997 (DE) .......................................... 197 25 617

(51) Int. Cl.$^7$ .......................... C08L 77/06; C08G 69/14; C08G 69/26

(52) U.S. Cl. ........................ 525/432; 528/324; 528/346

(58) Field of Search .......................... 525/432; 528/324, 528/346

(56) References Cited

U.S. PATENT DOCUMENTS

| | | | |
|---|---|---|---|
| 5,416,172 A | | 5/1995 | Blondel et al. |
| 5,684,120 A | * | 11/1997 | Torre .......................... 528/346 |
| 5,696,202 A | | 12/1997 | Torre |

FOREIGN PATENT DOCUMENTS

| | | |
|---|---|---|
| EP | 0553581 A2 | 8/1993 |
| EP | 0 885 930 A1 * | 12/1998 |

* cited by examiner

*Primary Examiner*—Tae H. Yoon
(74) *Attorney, Agent, or Firm*—Marshall & Melhorn, LLC

(57) ABSTRACT

The invention concerns a transparent polyamide alloy, produced by compounding it from 30–98% by weight of a transparent, amorphous, rigid and brittle polyamide A with at least 35 mole % cyclo-aliphatic diamine and a glass transition point of at least 150° C., and 2–70% by weight of a transparent, impact resistant polyamide B with at least 40–80 mole % of at least one long-chain polyamide-forming monomer, with more than 10 carbon atoms and at least 10 mole % terephthalic acid and a glass transition point of under 70° C.

6 Claims, No Drawings

IMPACT RESISTANT TRANSPARENT POLYAMIDE ALLOYS

CONTINUING APPLICATION DATA

This application is a continuation-in-part application of U.S. patent application Ser. No. 09/520,252, filed on Mar. 7, 2000, now abandoned, which is a continuation-in-part application of U.S. patent application Ser. No. 09/098,873, filed on Jun. 17, 1998, now abandoned, which claims priority from Federal Republic of Germany Patent Application No. 197 25 617.1, filed on Jun. 17, 1997. U.S. patent application Ser. No. 09/520,252 was pending as of the filing date of this application, and U.S. patent application Ser. No. 09/098,873 is now abandoned, but was pending as of the filing date of U.S. patent application Ser. No. 09/520,252.

BACKGROUND OF THE INVENTION

By means of working so-called impact resistant modifiers into brittle polymers, these can be improved decisively with respect to their toughness. The modification of impact resistance occurs usually by means of distributing, when the material is in a molten state, smaller constituents of a tough elastic polymer component having a low glass temperature into a greater portion of a different polymer or of a similar less tough polymer. The resulting alloy of polymers is a chemical blend or an alloy, and it has completely new properties in comparison with the original polymers. The modified new properties concern, besides the toughness, the viscosity, the strength, the hardness, the dimensional stability under heat, the creep tendency, the resistance against chemicals, the dimensional stability and others as well.

By working a second, e.g. an olefinic polymer phase, into a continuous polyamide matrix, the appearance and the surface properties are also being changed. Mostly surfaces of a white coloration or a mother-of-pearl structure are generated. In this process, transparent polyamides lose their transparency, one of their frequently most desired properties. Such impact resistant products are described in EP 0 073 036, in EP 191 548 or, more generally, in DAS 1 341 606.

By compounding of certain kinds of tough and transparency-compatible polymers, transparent polyamide alloys can nevertheless be obtained because of equal indices of refraction of the two phases. Thus, it is known that cladded-core polymers, such as methacrylate butadiene styrol copolymers, which are mentioned in JP 04 337 355, or that certain polyester amides, e.g. those made from polyamide 12 and caprolactone with other polyamides, which themselves contain polyamide 12 segments in a polymeric chain structure or that reactive polycarbonates with amorphous polyamides, e.g. of the type PA 61/6T, produce impact resistant, transparent polyamide blends.

From the EP 0 628 602 A1 transparent polyamides are known, which are built up from a semi-crystalline and thus cloudy or opaque amide and an amorphous polyamide. The resulting polyamide is, it is true, likewise transparent, but it has inadequate properties with respect to toughness and elongation and the dimensional stability under heat.

A further possibility for increasing the impact resistance of brittle transparent polyamides consists in adding to them by means of additional polymerization, for example, long-chain monomers by means of compounding, which improve the toughness, or by alloying them by means of compounding a tougher partially crystalline polyamide, as it is described in the patents U.S. Pat. No. 4,404,317, where polyamide 66, or in DE 2 642 244 where polyamide 12 or in U.S. Pat. No. 5,266,655 where polyamide 6 are added in an alloying process to amorphous copolyamides. By these measures, however, many particular properties of the original polyamides are often changed too much or many a desirable individual property, such as the transparency, is being lost or the appropriate monomers are not available in the required purity, amount or price.

It is, therefore, the objective of the present invention to propose new polyamide alloys, which essentially maintain the preferred properties of the original polyamides and improve in particular the toughness and elongation properties.

SUMMARY OF THE INVENTION

The present invention describes a transparent polyamide alloy, with a TG of >120° C. The polyamide is produced by compounding from 70–98% by weight of a transparent, amorphous, rigid and/or brittle polyamide A with a glass transition point of at least 180° C. containing not more than 25 mol % of a lactam or a ω-aminocarbonic acid with a carbon number of 6–12, at least 35 mol % of a cycloaliphatic diamine, and dicarbonic acids, excepting terephthalic acid, and 2–30% by weight of a transparent, amorphous, impact resistant polyamide B with a glass transition point below 90° C., containing 50–80 mol % of at least one long-chain lactam or ω-aminocarbonic acid or diamine/dicarbonic acid pair with more than 10 carbon atoms, and a diamine of $C_6$ carbon atoms and at least 10 mole % terephthalic acid.

DETAILED DESCRIPTION OF THE PREFERRED EMBODIMENT

There has been a surprising success in producing highly transparent and tough alloys in the case of transparent brittle and rigid polyamides, which e.g. also possess low polyamide 12 constituents in the polymer chain, and to do so with the aid of novel polyamides, which were produced from 50–80 mole % of a long-chain polyamide forming monomer with more than 10 C atoms and combinations of aliphatic and/or cyclo-aliphatic diamines and aromatic dicarbonic acids, where these can also be partially replaced by aliphatic acids. These have the preferred properties of the original polyamides, such as the glass point, the strength and rigidity, and they improve mainly the toughness and the elongation properties. Preferably, they are added by alloying to the PA12/6T types of material. The polyamide PA12/6T, which is added by alloying, acts in small amounts as an impact strength modifier and is quite compatible with the matrix of the original polyamide.

The novel copolyamides, which act as impact strength modifiers, and which are here referred to as copolyamides B, are preferably produced from 50–80 mole % Lactam 12, hexamethylene diamine and terephthalic acid. In place of Lactam 12, it is also possible to use w-aminolaurinic acid or dodecandiamine and dodecandic acid. In place of HMD, its alkyl homologues, such as 2,4,4- or, respectively, 2,2,4-trimethylhexamethylendiamine or isomers such as 2-methylpentamethylendiamine or even other aliphatic or araliphatic or cyclo-aliphatic diamines such as docandiamine or p- or respectively, m-xylilendiamine or 4,4' bis-aminomethyl-cyclo-hexane or PACM or MACM and similar materials, can also be used. For terephthalic acid, isophthalic acid or 2,6 naphthalindicarbonic acid or trimethylisophthalic acid or other aromatic dicarbonic acids can also be used. These can, furthermore, be replaced with up to 50% by aliphatic dicarbonic acids such as sebacinic acid or dodecandic acid.

The relatively brittle or rigid polyamides, here referred to as polyamides A, are amorphous and transparent and are distinguished by a glass transition temperature of more than 160° C. They can be obtained by applying at least 35 mole % of cyclo-aliphatic diamines. These amines are transformed by the use of more than 25 mole % into the polyamide forming monomers with 6–12 C atoms, which are known from the state of the art. It is also possible to transform those already described under polyamide B. It is known that the cyclo-aliphatic diamines increase the glass point and the modulus of polyamides and simultaneously reduce the impact strength and the notched bar impact strength toughness. The cyclo-aliphatic diamines contain usually 6–20 C atoms. Especially well suited are cyclo-aliphatic diamines with at least one 5-atom, 6-atom or 7-atom ring and bicyclic linkages with at least 7 C atoms. Examples of cyclo-aliphatic diamines are:

IPD isophorodiamine (5 amino-1,3,3 trimethyl-cyclo-hexanemethaneamine)
BAMC bis(aminomethyl-)cyclo-hexane
NBDA bis(aminomethyl-)bicyclo[2,2,1]heptane
PACM 4,4'diamino-cyclo-hexylmethane
MACM 3,3'-dimethyl-4,4'-diamino-dicyclo-hexylmethane
PACP 4,4'diamino-dicyclo-hexyl-2,2-propane
BN bis-aminomethylnorbornane
TCD 3(4),8(9)bis-aminomethyl-tricyclo-)5,2,1,0$^{2.6}$-decane The cyclo-aliphatic diamines are combined with aromatic and/or aliphatic dicarbonic acids. Especially well suited are isophthalic acid, terephthalic acid, 2,6-naphthalindicarbonic acid, adipinic acid, azelainic acid, dodecanic acid and/or dimeric acids.

In the case of the aliphatic di-acids, the long chain dicarbonic acids with 9 or more C atoms are especially well suited, because they lead to a low water absorption and an already basically good toughness of the polyamide.

For the object of the application it is essential, that with the polyamide A as well as the polyamide B, amorphous and thus transparent polyamides are being applied. It is, therefore, necessary to see to it during the production of the polyamide A or B, respectively, that the individual original compounds are used in such concentrations that no crystalline or, respectively, semi-crystalline and thus opaque products are generated. The polyamide B, therefore, consists preferably of 50–80 mole % of a long chain polyamide forming monomer with more than 10 C atoms and at least 10 mole % terephthalic acid, and of 10 mole % hexamethylendiamine and/or of HMD replacing the alkyl, and a cyclo-aliphatic diamine.

The transparent and tough polymer alloys in accordance with the invention are produced by compounding of 98–30% by weight of the brittle polyamide A and 2–70% by weight of the tough copolyamide B by means of mixing the 2 polyamides either before the compounding process in the form of granulates or by adding a dosage of one component to the other component during the compounding process. This controlled addition can occur by means of conveyor troughs or conveyor belts or directly from weighed containers into any desired melting zone of the compounding machine. By intimate mixing of the molten material, the phases of the components A and B mutually dissolve one another, and a block-like phase structure of the chains of molecules is generated, as long as the melting temperatures are not too high, which could then result in a change in the amidizing process. Suitable compounding temperatures are around 260–290° C.

It has been found especially advantageous in production of the transparent and tough polymer alloys in accordance with the invention to compound about 60–98% % by weight of the brittle polyamide A and 2–40% by weight of the tough copolyamide B by means of mixing the 2 polyamides either before the compounding process in the form of granulates or by adding a dosage of one component to the other component during the compounding process. This has been found especially advantageous in that the Tg values of the transparent polyamide are higher when the components are provided in this range, and the higher Tg values are important for the transparent polyamide of the present invention.

It has also been found that it can be preferable to use a special amin for the polyamide B, specifically a c-6 diamine, for example Hexamethylendiamin.

The light-colored, transparent alloys according to the invention are thus distinguishing themselves by a good level of toughness, high rigidity, a good dimensional stability at heat and a good resistance to solvents, and they are suitable for a multiplicity of applications in the area of medicine and hygiene, toiletries, sports and spare time activities, house and kitchen appliances, for covers in the area of electrical equipment and machinery, for containers etc.

The transparent and tough polyamide alloys according to the invention are explained more fully by the following examples:

EXAMPLE 1

A copolyamide, produced from a 18 mole % laurinlactam, 41 mole % 3,3' dimethyl-4,4' diamino-dicyclo-hexylmethane and 41 mole % isophthalic acid with a solution viscosity in 0.5% m-cresol of 1.45, a glass point of 205° C., an impact resistance according to DIN 53453 (at 23□/dry) of 45 kJ/m$^2$, a notched bar test impact resistance (DIN 53453) of 2.8 kJ/m$^2$ (23□ dry) and a modulus of elasticity (DIN 53457) of 2500 N/mm$^2$ (23□ dry) was mixed with 10% by weight of a copolyamide PA 12/6T, which had been poly-condensated from 60 mole % laurinlactam, 20 mole % hexamethylenediamine and 20 mole % terephthalic acid, and had a solution viscosity of in 0.5% m-cresol of 1.8, a glass point of 62° C., an impact strength of 0B, a notched bar test impact strength of 9 kJ/m$^2$ and a modulus of elasticity of 1850 N/mm$^2$ and which was compounded in an extruder of the type "Werner Pfleiderer ZSK 30" at 285° C. The resultant mixture of polymers was of a light color and transparent after drying, and the properties measured with the use of tensile test samples made from it were as follows: Glass point 185° C., impact strength (DIN 53453), 80% OB-20% 85 kJ/m$^2$ (23□/dry), notched bar test impact strength (DIN 52453); 23□/dry), 4.8 kJ/m$^2$, modulus of elasticity (DIN 53457, 23□/dry), 2420 N/m$^2$.

EXAMPLE 2

In the same extruder as in example 1 (Werner Pfleiderer ZSK 30), a granulate mixture was compounded at 280° C., which consisted of 80% by weight of an amorphous copolyamide PA12/MACMI and 20% by weight of a copolyamide CoPA 12/6T/6I. The amorphous copolyamide PA12/MACMI was poly-condensated from 20 mole % Lactam 12 and 40 mole % 3,3'-dimethyl-4,4'diamino-dicyclo-hexylmethane and 40 mole % isophthalic acid, and it had a solution viscosity (0.5% m-cresol) of 1.43, a glass point of 196° C., an impact resistance (according to DIN 53453) at 23□/dry of 60% OB and 40% 66 kJ/m$^2$, a notched bar test impact resistance (according to DIN 53453) at 23□/dry of 1.6 kJ/m$^2$ and a modulus of elasticity (according to DIN 53457) of 2410 N/mm$^2$ (23□/dry). The CoPA 12/6T/6I which had been produced of 80 mole % Lactam 12, 10 mole % of a 1:1 mixture of terephthalic acid and isophthalic acid, had the following properties: Glass point 36° C., μrel 1.93 (0.5 m-cresol), impact strength (according to DIN 53453), OB (23 □/dry), notched bar test impact strength (DIN 52453) 20% OB-80%, 26 kJ/m² (23□/dry), module of elasticity (DIN 53457, (23 □/dry), 1070 N/m². The transparent and light-colored alloy produced had a glass point after drying and as measured with the test bars of 164° C., an impact strength (DIN 53453) 40% OB-60% 80 kJ/m² (23□/dry), a notched bar test impact resistance (DIN 53453) of 7.2 kJ/M² (23□/dry) and a modulus of elasticity of (DIN 53457) of 2290 N/mm² (23□/dry).

EXAMPLE 3

The following two polyamides were mixed and compounded in an extruder, as was explained above:
90% of a polyamide, produced from dodecandic acid and 3,3'-dimethyl-4,4'diamino-dicyclo-hexylmethane of a solution viscosity in 0.5% m-cresol) of 1.61 with a glass point of 158.3° C., an impact resistance according to DIN 53453 OB (23□/dry), a notched bar test impact resistance of 5.68 kJ/m² (DIN 53453, 23□/dry) and a modulus of elasticity (according to DIN 53457, 23□/dry) of 1525 N/mm² and 10% by weight of a copolyamide 12/6T, made from 75 mole % Lactam 12, 12.5 mole % hexamethylenediamine and 12.5 mole % terephthalic acid, a solution viscosity 1.84 (0.5% m-cresol) with a glass point of 43.5° C., an impact resistance (DIN 53453) OB(23□/dry) a notched bar test impact resistance (DIN 53453) of 16 kJ/m² (23□/dry) and a modulus of elasticity(DIN 53457) of 1550 N/mm² (23□/dry). The granulated and dried compound was very transparent. The values, which were measured with the test bar, are:
Glass point 143° C., impact strength without fracture and notched bar test impact strength 8.2 kJ/m² according to DIN 53453, modulus of elasticity (DIN 53457) 1550 n/mm².

COMPARISON EXAMPLE A

This comparison example for a transparent blend from an amorphous copolyamide and a partially crystalline polyamide is taken from EP 0 070 001. 80% of a copolyamide PA 6I/6T/PACMI/PACMT (66.8/28.6/3,2/1,4) with an intrinsic viscosity of 0.93, a glass point TG 128° C., an $HDT_A$ at 1.8 N/mm² of 123° C., a yield stress of 96.6 N/mm², an elongation at tear of 49%, a modulus of elasticity of 2780 N/mm² and a notched bar test impact strength of 3.37 kJ/m² (=85.4 J/m) was compounded with 20% polyamide 66 in a Werner Pfleiderer extrusion machine to a transparent blend with the following properties: $HDT_A$ (1.8 N/mm²) 108° C., yield stress 98.7 N/mm², elongation at tear 75%, notched bar test impact strength 2.78 kJ/m² (=70.46 J/m).

Here the impact strength modification was not particularly effective.

COMPARISON EXAMPLE B

This example was taken from U.S. Pat. No. 4,536,541. A similar amorphous copolyamide, a PA 6I/6T/PACMI/PACMT(57,6/24,7/12,4/4,3) with a glass point of 146° C., a yield stress of 82 N/mm², with a modulus of elasticity of 2800 N/MM² and a notched bar test impact strength of 2.80 kJ/M² was compounded with 10% of an impact strength modifier of the type of an ethylene-propylene-hexadiene-norbonadiene (68/24/6,4/1,6), to which was grafted a maleinic acid anhydride, and 15.0% of an impact strength modifier of the type ethylene-propylene-hexadiene-norbonadiene copolymer to which likewise was grafted MAH of a different viscosity. The blend resulted in a completely milky-white appearance, also without transparency, and it was impact resistant. The blend had the following properties: Glass point 140° C., yield stress 54 N/m², elongation at tear 93%, modulus of elasticity 1500 N/mm², notched bar test impact strength 38.6 kJ/m².

Thus, the blend was not transparent any more, but white, and it suffered a strong reduction of the yield stress and the modulus of elasticity.

An additional example of a transparent polyamide according to the present invention is produced by compounding about 40–98% of a transparent, amorphous, rigid and/or brittle polyamide A with at least 35 mol % of a cyclo-aliphatic diamine, not more than 25 mol % of a long chain polyamide forming monomer of a carbon number 6–12, which is a lactam or a ω-aminocarbonic acid and has a glass transition point of at least 160° C., and 2–40% by weight of a transparent, amorphous, impact resistant polyamide B with 50–80 mol % of at least one long chain lactam or ω-aminocarbonic acid or diamine/dicarbonic acid pair with more than 10 carbon atoms and which contain a diamine of $C_6$ carbon atoms and at least 10 mol % terephthalic acid and has a glass transition point below 90° C.

Preferably in this example, the cyclo-aliphatic diamine of polyamide A is selected from: 3,3-dimethyl-4,4'-diamineodicyclohexyl-methane, 4,4'-diamino-dicyclohexyl-2,2 propane, 4,4'-diamino-dicyclohexyl-methane, 5-amino-1,3,3-trimethyl-cyclohexane-methane-amine, bis (aminomethyl)-cyclohexane, bis(aminomethylnorbornane), and/or 3(4), 8(9) bis aminomethyl-tricyclo-$5,2,1,0^{2-6}$-decane or its mixtures.

Also preferably in this example, in the polyamide B, besides the terephthalic acid, the further dicarbonic acids are chosen from isophthalic acid, 2,6-naphthalinecarbonic acid, tributylisophthalic acid, azeleinic acid, sebacinic acid, dodecandic acid or a $C_{36}$-dicarbonic acid or their mixtures. The long-chain monomers in the polyamide B are preferably chosen from w-aminolauric acid, lauryllactam or dodecandioic acid or their mixtures, and the polyamide B preferably contains 4,4' diamine-dicyclo-hexylmethane, 4,4' diamine-dicyclo-hexyl 1-2,2'-propane or their mixtures. In addition, the polyamide alloy preferably contains additives such as mold-release agents, slipping agents, ultra violet and heat stabilizers, catalyzers, softeners, pigments, colors, fillers, glass and carbon fibers and mineral materials.

It has been found that the higher the content of lauryllactam the lower the Tg value. A monomer content of not more than 25 mol % in polyamide A has been found to produce a Tg value greater than 170° C., typically in the range of 180–190° C. It has been found, according to the present invention, that by maximizing the Tg value in the starting amorphous polyamide A, that higher Tg values are possible in the final polyamide alloy. The present invention tries to minimize the difference between the Tg of polyamide A and the Tg of the final product.

It has been found that as the Tg rises, so too does the brittleness and rigidity with a corresponding decrease in toughness. Therefore, the amorphous tough polyamide B (preferably PA12/6T), when added to the polyamide A, reduces the brittleness and produces a higher toughness while minimizing the decrease in Tg and other preferred properties of the final alloy. A typical Tg of a preferred polyamide B of the present invention, is about 90° C. Preferably, according to the present invention, semicrystalline polyamides are not used as either polyamide A or polyamide B. Semicrystalline polyamides are typically more resistant to chemical agents than amorphous polyamides. The higher resistance of semicrystalline polyamides is not necessary in the present invention.

In a preferred embodiment of the present invention, a transparent polyamide alloy, with a TG of >120° C., is produced by compounding from 70–98% by weight of a transparent, amorphous, rigid and/or brittle polyamide A with a glass transition point of at least 180° C. containing not more than 25 mol % of a lactam or a ω-aminocarbonic acid with a carbon number of 6–12, at least 35 mol % of a cycloaliphatic diamine, and dicarbonic acids except terephthalic acid and 2–30% by weight of a transparent, amorphous, impact resistant polyamide B with a glass transition point below 90° C., containing 50–80 mol % of at least one long-chain lactam or ω-aminocarbonic acid or diamine/dicarbonic acid pair with more than 10 carbon atoms, and a diamine of $C_6$ carbon atoms and at least 10 mole % terephthalic acid.

In a further preferred ambodiment of the present invention, the cycloaliphatic diamine of the polyamide A is one selected from the group consisting of 3,3'-dimethyl-4,4'-diamino-dicyclohexylmethane, 4,4'-diamino-dicyclo-hexyl-2,2-propane, 4,4'-diamino-dicyclohexylmethane, 5-amino-1,3,3-trimethyl-cyclo-hexanemethaneamine, bis(aminomethyl)-cyclohexane, bis-(aminomethylnorbornane), 3(4),8(9)bis-aminomethyl-tricyclo $5,2,1,0,^{2,6}$-decane or its mixtures.

In yet another preferred embodiment of the present invention, the polyamide B, besides the terephthalic acid, contains further dicarbonic acids selected from the group consisting of isophthalic acid, 2,6-naphthaline dicarbonic acid, tributylisophthalic acid, azeleinic acid, sabacinic acid, dodecanedioic acid or a $C_{36}$-dicarbonic acid or their mixtures.

In still another preferred embodiment of the present invention, the long-chain monomers in the polyamide B is selected from the group consisting of Lactam 12 or ω-aminolaurinic acid, a dodecandioic acid/dodecandiamine pair or their mixtures.

In still another preferred embodiment of the present invention, the polyamide B contains 4,4' diaminedicyclohexylmethanes, 4,4' diamino-dicyclohexyl -2,2'-propanes or their mixtures.

What is claimed is:

1. A transparent polyamide alloy, with a TG of>120° C. produced by compounding from 70–98% by weight of a transparent, amorphous, rigid and/or brittle polyamide A with a glass transition point of at least 180° C. containing not more than 25 mol % of a lactam or a ω-aminocarbonic acid with a carbon number of 6–12, at least 35 mol % of a cycloaliphatic diamine, and dicarbonic acids except terephthalic acid and 2–30% by weight of a transparent amorphous, impact resistant polyamide B with a glass transition point below 90° C., containing 50–80 mol % of at least one long-chain lactam or co-aminocarbonic acid or diamine/dicarbonic acid pair with more than 10 carbon atoms, and a diamine of $C_6$ carbon atoms and at least 10 mole % terephthalic acid, wherein the polyamide B, besides the terephthalic acid, contain further dicarbonic acids selected from the group consisting of isophthalic acid, 2,6-naphthaline dicarbonic acid, tributylisophthalic acid, azeleinic acid, sabacinic acid, dodecanedioic acid or a $C_{36}$-dicarbonic acid and their mixtures.

2. A polyamide alloy according to claim 1, characterized in that the cycloaliphatic diamine of the polyamide A is one selected from the group consisting of 3,3'-dimethyl-4,4'-diamino-dicyclohexylmethane, 4,4'-diamino-dicyclo-hexyl-2,2-propane, 4,4'-diamino-dicyclohexylmethane, 5-amino-1,3,3-trimethyl-cyclo-hexanemethaneamine, bis(aminomethyl)-cyclohexane, bis-(aminomethylnorbornane), 3(4),8(9)bis-aminomethyl-tricyclo $5,2,1,0,^{2,6}$ decane and its mixtures.

3. Polyamide alloy according to claim 1, characterized in that the long-chain monomers in the polyamide B is one selected from the group consisting of Lactam 12 or ω-aminolaurinic acid, a dodecandioic acid/dodecandiamine pair and their mixtures.

4. A transparent polyamide alloy, with a TG of>120° C., produced by compounding from 70–98% by weight of a transparent, amorphous, rigid and/or brittle polyamide A with a glass transition point of at least 180° C. containing not more than 25 mol % of a lactam or a ω-aminocarbonic acid with a carbon number of 6–12, at least 35 mol % of a cycloaliphatic diamine, and dicarbonic acids except terephthalic acid and 2–30% by weight of a transparent, amorphous, impact resistant polyamide B with a glass transition point below 90° C., containing 50–80 mol % of at least one lone-chain lactam or ω-aminocarbonic acid or diamine/dicarbonic acid pair with more than 10 carbon atoms, and a diamine of $C_6$ carbon atoms and at least 10 mole % terephthalic acid, wherein the polyamide B contains 4,4' diaminedicyclohexylmethanes, 4,4' diamino-dicyclohexyl -2,2'-propanes and their mixtures.

5. A polyamide alloy according to claim 4, characterized in that the cycloaliphatic diamine of the polyamide A is one selected from the group consisting of 3,3'-dimethyl-4,4'-diamino-dicyclohexylmethane, 4,4'-diamino-dicyclo-hexyl-2,2-propane, 4,4'-diamino-dicyclohexylmethane, 5-amino-1,3,3 trimethyl-cyclo-hexanemethaneamine, bis(aminomethyl)-cyclohexane, bis-(aminomethylnorbornane), 3(4),8(9)bis-aminomethyl-tricyclo $5,2,1,0,^{2,6}$-decane and its mixtures.

6. Polyamide alloy according to claim 4, characterized in that the long-chain monomers in the polyamide B is one selected from the group consisting of Lactam 12 or ω-aminolaurinic acid, a dodecandioic acid/dodecandiamine pair and their mixtures.

* * * * *